Nov. 6, 1951 L. C. HUFF 2,573,906
MULTISTAGE CATALYTIC CONVERSION OF BITUMINOUS SOLIDS
Filed Dec. 18, 1944 2 SHEETS—SHEET 1

Inventor:
Lyman C. Huff
By: Lee J. Gary
Attorney

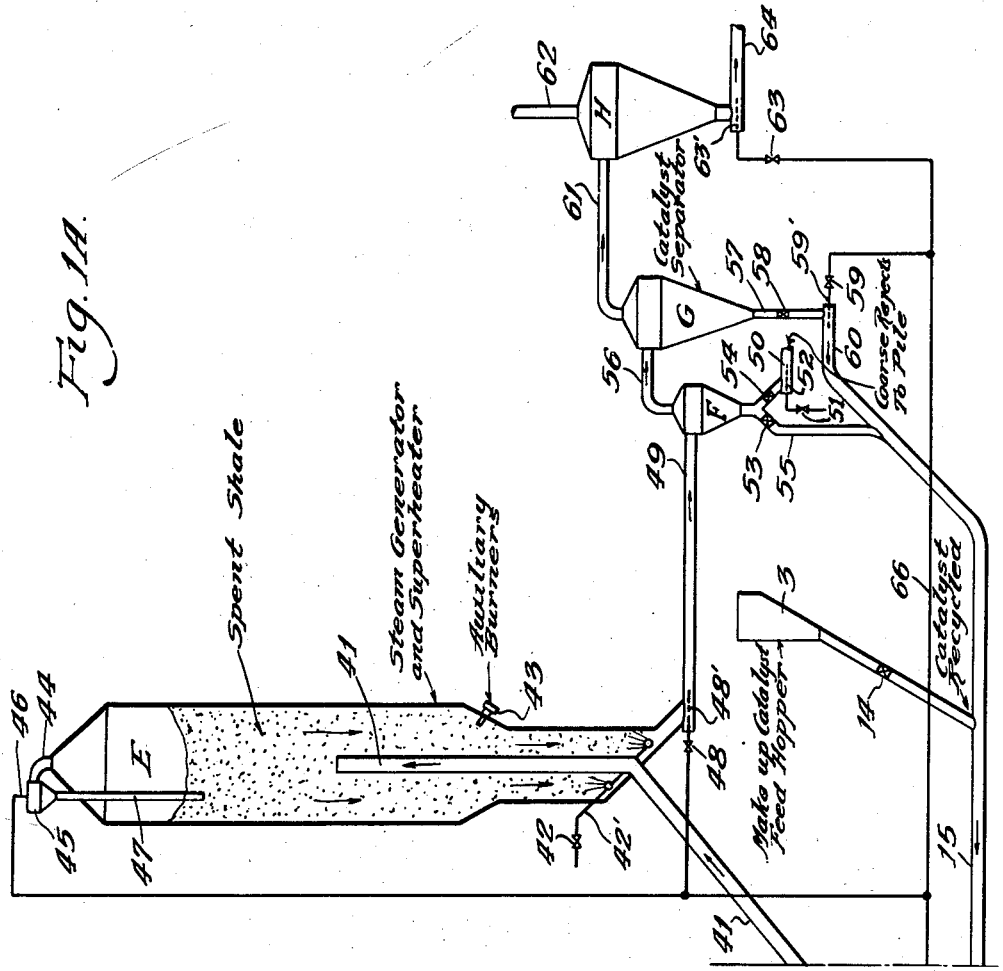

Patented Nov. 6, 1951

2,573,906

UNITED STATES PATENT OFFICE 2,573,906

MULTISTAGE CATALYTIC CONVERSION OF BITUMINOUS SOLIDS

Lyman C. Huff, Wilmette, Ill., assignor to Universal Oil Products Company, Chicago, Ill., a corporation of Delaware Application December 18, 1944, Serial No. 568,738

4 Claims. (Cl. 202—14)

This invention relates to the conversion of (hydrocarbons produced from) oil shale, coal, lignite, and similar bituminous solids. More particularly it has reference to a multistage process and apparatus for the catalytic conversion of the hydrocarbon constituents of such bituminous solids.

One of the unique features of my invention is the method of controlling the conversion of the shale, etc. by the addition of an active synthetic catalyst of known composition and characteristics. Another feature of my invention is the separation of coarse and fine particles of the mixture of added catalyst and bituminous solid in the reactors in successive stages and the recycling of the coarser particles, consisting mostly of the added catalyst, to a preceding stage of reaction. In the present invention in the conversion of bituminous solids in admixture with large quantities of a synthetic type of silica-alumina catalyst, the solid-oil ratio is greatly increased but may be adjusted to any desired figure, depending upon the rate at which the catalyst is recycled from one stage to another.

In the conversion of oil shale little is known about its organic or hydrocarbon content (kerogen) except that, like that of other bituminous solids, it consists of complex compounds which, on ultimate analysis, appear as carbon, hydrogen, oxygen, nitrogen and sulphur.

When oil shale is heated, the organic matter decomposes and is converted into a crude oil or liquid bitumen which cracks into light, intermediate and heavy fractions. Gas and a carbonaceous residue are also produced. Fractional distillation of the crude oil produces fractions of the character of light naphtha, kerosene, gas oil, fuel oil, lubricating oils, and a bituminous or carbonaceous residue. Shale also contains a small percentage of water, while the spent shale or non-volatile portion contains mineral matter which consists largely of silica and alumina with lesser percentages of iron, calcium and magnesium. The mineral matter of other bituminous solids, such as coal and lignite is of substantially similar composition. Such mineral matter has a minor catalytic effect but unless augmented by an added active synthetic catalyst, an uncontrolled thermal reaction results in excessive formations of gas and carbon.

When oil shale or similar bituminous solid, in ground or crushed form, is mixed with large quantities of a synthetic catalyst having known characteristics and composition, the silica-alumina content of the mineral matter in the solid is augmented and the increased ratio of the mixture of added catalyst and solid to the oil results in obtaining greater yields of more desirable light oil fractions than has hitherto been possible.

Figure 1 shows diagrammatically in elevation, one form of apparatus in which my invention may be practiced whereby ground or crushed oil shale by means of hopper 1 and feeder 2, is continuously fed through valve 3 into transfer line 12 and then into the bottom of reactor A in admixture with an active silica-alumina catalyst in which the percentage of silica is usually present in a major proportion as compared to the alumina. The added catalyst is fed either continuously or intermittently into transfer line 15 from hopper 3, through valve 14. The mixture of shale and added catalyst, fluidized by the admission of superheated steam from main distributing line 66 through valve 4 and jet 4', rises to the upper part of reactor A, where the mixture of partly distilled shale and the catalyst overflows into the center pipe 6. Initial conversion is effected in reactor A at temperatures of 600 to 700 degrees F. and the light oil fractions are removed through vapor outlet 5, cyclone separator 9 and line 11. Catalyst from separator 9 is returned through line 13 to reactor A. Superheated steam in main distribution line 66 is provided either from an external source through line 65 and valves 65' and 65'' or from line 46 leading from the top of retort E in which it is generated.

By means of superheated steam through valve 7 and jet 7', the mixture of shale and catalyst passes through transfer line 8 into reactor B for the second stage of conversion at a temperature range of 700 to 800 degrees F. Intermediate oil fractions leave reactor B through vapor outlet 16, cyclone separator 17 and line 18. Catalyst from separator 17 is returned to reactor B through line 19. In reactor B a separation of the coarse particles of shale and catalyst is effected. The coarser particles, consisting largely of added catalyst, overflow into the annular space between pipes 6' and 10, and pass downward into transfer line 20 from which these coarse particles are recycled by means of superheated steam through valve 21 and jet 21' into transfer line 12 and from there back to reactor A. The material recycled from reactor B at a higher temperature than reactor A, furnishes a greater part of the heat needed for the initial conversion and distillation in the first stage. This conservation of heat by recycling of hot catalyst and bituminous solid, which is one of the features of my invention, is repeated in the succeeding stages of conversion, the higher temperature of the succeeding stage furnishing the necessary heat for conversion of the oil in the preceding stage.

In the upper part of reactor B the lighter, finer, material consisting largely of partially spent shale, overflows into pipe 6', through which it passes downward and is injected into transfer line 23 by means of superheated steam through valve 23' and jet 23". After passing through line 23, the partially spent shale passes upward through reactor C in admixture with coarser material (mostly added catalyst) recycled from regenerating retort D.

In reactor C, where conversion and separation of the heavy oil fractions is effected, the vapors leave through outlet 22, cyclone separator 24 and line 25. Catalyst from separator 24 is returned to reactor C through line 26. Reactor C operates in a higher temperature range than reactor B (800-950 degrees F.) and a separation of the finer and coarser particles of shale and added catalyst is again effected. The heavier, coarser particles overflow into the annular space between pipes 6" and 10' as previously noted, and are recycled by means of superheated steam through valve 27 and jet 27', down through transfer line 28, and up through line 29 back to reactor B, where they furnish the greater part of the heat required for the second stage of conversion.

The lighter, finer material, largely spent shale, separated in reactor C, flows downward through pipe 6", from which it is discharged by means of jet 30 supplied with air through valve 67 and steam through valve 30', up through transfer line 31, into the bottom of retort D in which regeneration of the catalyst is effected at a temperature range of 1000°-1400° F. by combustion of the carbonaceous matter adhering to it. The air is needed for combustion and the steam is supplied to control the rate of combustion. Additional heat may be supplied, if necessary, by means of auxiliary burners 32. Gaseous products of combustion in retort D pass out through outlet 36, cyclone separator 37 and line 38. Catalyst from separator 37 is returned to retort D through line 39.

Separation of the coarse and fine particles of added catalyst and shale is also effected in retort D in a manner similar to the separation in the other chambers. The coarser particles overflow into the annular space between pipes 6'" and 10" and are recycled through transfer line 33 by means of superheated steam through valve 34 and jet 34' into transfer line 35 and thence into retort C. This recycled material, at the higher temperatures employed in regenerator D, supplies the greater portion of the heat required for the conversion of the heavy oil fractions in reactor C.

In regenerating retort D, the finer material (mostly spent shale) overflows into pipe 6'" from which, by means of feeder 40, and assisted by superheated steam through valve 40' and jet 40", this material passes through transfer line 41 into retort E. Water, which is introduced through line 42 into the bottom of the bed of hot material (largely spent shale with some added catalyst particles), is generated into steam by direct contact with the hot mass, and is superheated as it passes upward through the retort. Additional heat, if necessary may be supplied by auxiliary burners 43. Superheated steam passes out at the top of retort E through outlet 44 and cyclone separator 45 into line 46 which connects with the main distributing line 66. Catalyst from separator 45 is returned to retort E through line 47.

Spent shale from the bottom of retort E is discharged by means of superheated steam through valve 48 and jet 48' into transfer line 49 leading to cyclone separator F from which the coarse particles either may be withdrawn from the system by means of valve 54 through line 50 by means of steam through valve 51 and jet 52 or recycled through valve 53 and line 55 into line 15 and thence back to reactor A. The remaining material, separated in F, passes through transfer line 56 to separator G where the intermediate particles (mostly regenerated catalyst) after being separated from the finer particles are then returned through line 57 and valve 58 by means of steam through valve 59 and jet 59' into line 60 leading into line 15 and thence through line 12 into reactor A.

The finer, completely spent particles of shale are discharged from G through line 61 to hopper H provided with vent 62. Steam through valve 63 and jet 63' discharges the material from the system through pipe 64.

The process, as specifically described for the conversion of oil shale, may be employed in a similar manner for the catalytic conversion of other bituminous solids, such as coals and lignites.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

I claim as my invention:

1. A process for recovering hydrocarbons from solid bituminous material having a natural mineral content of silica and alumina which comprises augmenting the silica and alumina content of said material by adding thereto a substantial quantity of particles of a silica-alumina catalyst of higher catalytic activity than said natural mineral content, distilling the resultant mixture in a series of distillation stages maintained at successively higher distillation temperatures, fluidizing the admixed solids in each of said stages beyond the first stage of lowest temperature to separate catalyst particles from bituminous material, returning thus separated catalyst particles in heated condition from a stage of higher temperature to a preceding stage of lower temperature, and supplying bituminous material from each of the stages of the series, except the last, to a succeeding stage of higher temperature.

2. A process for recovering hydrocarbons from solid bituminous material having a natural mineral content of silica and alumina which comprises augmenting the silica and alumina content of said material by adding thereto a substantial quantity of particles of a silica-alumina catalyst of higher catalytic activity than said natural mineral content, distilling the resultant mixture in a first stage, supplying admixed bituminous material and catalyst from the first stage to a second distillation stage maintained at higher temperature than the first stage, fluidizing the admixed solids in said second stage to separate catalyst particles from residual bituminous material during the distillation in the second stage, and returning thus separated catalyst particles in heated condition from the second stage to the first stage.

3. A process for the recovery of hydrocarbons from solid bituminous material having a natural mineral content of silica and alumina which comprises augmenting the silica and alumina content of said material by commingling the bituminous material in subdivided form with a substantial quantity of silica-alumina catalyst particles of higher catalytic activity than said natural mineral content, maintaining the resultant mixture in a substantial body under distillation conditions, fluidizing said body during the distillation to separate catalyst particles from residual bituminous solids, and separately removing from said body a predominantly catalyst stream and a stream predominating in residual bituminous solids.

4. A process for the recovery of hydrocarbons from solid bituminous material having a natural mineral content of silica and alumina which comprises augmenting the silica and alumina content of said material by commingling the bituminous material in subdivided form with a substantial quantity of silica-alumina catalyst particles of higher catalytic activity than said natural mineral content, maintaining the resultant mixture in a substantial body under distillation conditions, fluidizing said body during the distillation to separate catalyst particles from residual bituminous solids, removing from the upper portion of said body a stream predominating in residual bituminous solids, and separately removing from a lower point of said body a predominantly catalyst stream.

LYMAN C. HUFF.

REFERENCES CITED

The following references are of record in the file of this patent:

UNITED STATES PATENTS

| Number | Name | Date |
|---|---|---|
| 1,276,879 | Crane | Aug. 27, 1918 |
| 1,291,137 | Reed | Jan. 14, 1919 |
| 1,432,101 | Danckwardt | Oct. 17, 1922 |
| 1,712,082 | Koppers | May 7, 1929 |
| 1,852,709 | Kern | Apr. 5, 1932 |
| 1,941,809 | McKee | Jan. 2, 1934 |
| 1,943,291 | Abbott | Jan. 16, 1934 |
| 1,983,943 | Odell | Dec. 11, 1934 |
| 1,984,380 | Odell | Dec. 18, 1934 |
| 2,075,101 | Dreyfus | Mar. 30, 1937 |
| 2,094,946 | Hubmann | Oct. 5, 1937 |
| 2,379,077 | Harding | June 26, 1945 |
| 2,379,734 | Martin | July 3, 1945 |
| 2,480,670 | Peck | Aug. 30, 1949 |